US008811676B2

(12) United States Patent
Kitamura et al.

(10) Patent No.: US 8,811,676 B2
(45) Date of Patent: Aug. 19, 2014

(54) IMAGE PROCESSING APPARATUS, IMAGE PROCESSING METHOD, AND COMPUTER READABLE RECORDING DEVICE

(75) Inventors: Makoto Kitamura, Hachioji (JP); Yamato Kanda, Hino (JP); Takehiro Matsuda, Hachioji (JP); Takashi Kono, Tachikawa (JP); Masashi Hirota, Hachioji (JP)

(73) Assignee: Olympus Corporation, Tokyo (JP)

( * ) Notice: Subject to any disclaimer, the term of this patent is extended or adjusted under 35 U.S.C. 154(b) by 133 days.

(21) Appl. No.: 13/558,422

(22) Filed: Jul. 26, 2012

(65) Prior Publication Data

US 2013/0028485 A1     Jan. 31, 2013

(30) Foreign Application Priority Data

Jul. 29, 2011    (JP) ................. 2011-167269

(51) Int. Cl.
*G06K 9/00* (2006.01)
*G06T 7/00* (2006.01)
*A61B 1/00* (2006.01)

(52) U.S. Cl.
CPC ..... *G06T 7/0012* (2013.01); *G06T 2207/20076* (2013.01); *G06T 2207/10068* (2013.01); *G06T 2207/30028* (2013.01)
USPC ............................ 382/106; 382/224; 600/104

(58) Field of Classification Search
CPC ................................. G06K 9/00; A61B 1/00
USPC ................. 382/100, 103, 106–107, 128–133, 382/162–168, 173, 181, 199, 201, 219, 224, 382/232, 254, 274, 276, 286–291, 305, 382/312; 600/109, 104; 345/65
See application file for complete search history.

(56) References Cited

U.S. PATENT DOCUMENTS

| 2004/0184646 | A1* | 9/2004 | Oosawa | 382/128 |
| 2008/0086028 | A1 | 4/2008 | Matsui | |
| 2008/0279431 | A1* | 11/2008 | Kitamura | 382/128 |

(Continued)

FOREIGN PATENT DOCUMENTS

JP      2010-113616      5/2010

OTHER PUBLICATIONS

Huang, C.T., et al. "A Euclidean Distance Transform Using Grayscale Morphology Decomposition", IEEE Transactions on Pattern Analysis and Machine Intelligence, vol. 16, No. 4, Apr. 1, 1994, pp. 443-448.

(Continued)

*Primary Examiner* — Seyed Azarian
(74) *Attorney, Agent, or Firm* — Scully, Scott, Murphy & Presser, P.C.

(57) ABSTRACT

An image processing apparatus includes a distance information calculator that calculates distance information corresponding to a distance to an imaging object at each of portions in an image; a feature data calculator that calculates feature data at each portion in the image; a feature data distribution calculator that calculates a distribution of the feature data in each of regions that are classified according to the distance information in the image; a reliability determining unit that determines the reliability of the distribution of the feature data in each of the regions; and a discrimination criterion generator that generates, for each of the regions, a discrimination criterion for discriminating a specific region in the image based on a determination result of the reliability and the distribution of the feature data in each of the regions.

23 Claims, 11 Drawing Sheets

(56) References Cited

U.S. PATENT DOCUMENTS

2008/0292154 A1* 11/2008 Nishimura et al. ........... 382/128
2009/0097725 A1   4/2009 Krupnik et al.
2009/0306474 A1* 12/2009 Wilson .......................... 600/109
2010/0119110 A1* 5/2010 Kanda ........................... 382/103

OTHER PUBLICATIONS

European Search Report dated Dec. 12, 2012 from corresponding European Patent Application No. EP 12 00 5412.7.

* cited by examiner

IMAGE PROCESSING APPARATUS, IMAGE PROCESSING METHOD, AND COMPUTER READABLE RECORDING DEVICE

CROSS-REFERENCE TO RELATED APPLICATIONS

This application is based upon and claims the benefit of priority from Japanese Patent Application No. 2011-167269, filed on Jul. 29, 2011, the entire contents of which are incorporated herein by reference.

BACKGROUND OF THE INVENTION

1. Field of the Invention

The present invention relates to an image processing apparatus, an image processing method, and a computer readable recording device for processing an in-vivo intraluminal image formed of a plurality of wavelength components.

2. Description of the Related Art

As image processing performed on an image that is captured by a medical observation apparatus, such as an endoscope or a capsule endoscope, inside a lumen of a living body (hereinafter, the image is described as an intraluminal image or simply described as an image), there is a known technology for extracting a specific region, such as an abnormal area, based on a distribution of feature data in the image (for example, Japanese Laid-open Patent Publication No. 2010-113616).

The endoscope or the capsule endoscope captures an image that covers from a near view to a distant view through a content fluid (a digestive fluid, such as bile) inside the lumen; therefore, color information in the image varies depending on the amount of the content fluid through which light passes. Specifically, in a feature space based on the color information, a boundary used for discriminating whether an imaging object is a normal area or a lesion area varies depending on a distance from a capsule endoscope or the like to the imaging object. Therefore, in the technology disclosed in Japanese Laid-open Patent Publication No. 2010-113616, an image is divided into regions based on the value of a specific wavelength component (specifically, a R component), which is specified according to the degree of absorption or scattering in a living body from among a plurality of wavelength components contained in the image, and a target of interest in each of the divided regions is specified by using a discrimination criterion set for each of the regions. Consequently, it becomes possible to accurately discriminate a lesion area irrespective of the distance to the imaging object.

SUMMARY OF THE INVENTION

An image processing apparatus according to an aspect of the present invention includes: a distance information calculator that calculates distance information corresponding to a distance to an imaging object at each of portions in an image; a feature data calculator that calculates feature data at each of the portions in the image; a feature data distribution calculator that calculates a distribution of the feature data in each of regions that are classified according to the distance information in the image; a reliability determining unit that determines a reliability of the distribution of the feature data in each of the regions; and a discrimination criterion generator that generates, for each of the regions, a discrimination criterion for discriminating a specific region in the image based on a determination result of the reliability and the distribution of the feature data in each of the regions.

An image processing method according to another aspect of the present invention includes: calculating distance information corresponding to a distance to an imaging object at each of portions in an image; calculating feature data at each of the portions in the image; calculating a distribution of the feature data in each of regions that are classified according to the distance information in the image; determining a reliability of the distribution of the feature data in each of the regions; and generating, for each of the regions, a discrimination criterion for discriminating a specific region in the image based on a determination result of the reliability determined at the determining and the feature data distribution in each of the regions.

A computer readable recording device according to still another aspect of the present invention has an executable program stored thereon, wherein the program instructs a processor to perform: calculating distance information corresponding to a distance to an imaging object at each of portions in an image; calculating feature data at each of the portions in the image; calculating a distribution of the feature data in each of regions that are classified according to the distance information in the image; determining a reliability of the distribution of the feature data in each of the regions; and generating, for each of the regions, a discrimination criterion for discriminating a specific region in the image based on a determination result of the reliability determined at the determining and the feature data distribution in each of the regions.

The above and other features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of an image processing apparatus, an image processing method, and an image processing program will be explained with reference to the accompanying drawings. The present invention is not limited by the embodiments below. In the descriptions of the drawings, the same components are denoted by the same symbols.

In the following embodiments, an example will be explained in connection with a process performed on a series of intraluminal images (hereinafter, also simply described as images) that are obtained by capturing images of the inside of a lumen of a subject in a time series by a medical observation apparatus, such as an endoscope or a capsule endoscope. In the following explanation, an image subjected to image processing is, for example, a color image having a pixel level (a pixel value) of 256 tones for each of color components R (red), G (green), and B (blue) at each pixel position. The present invention is not limited by the intraluminal images, but may be widely applied to any case where a specific region is extracted from an image obtained by other general image acquiring apparatuses.

First Embodiment

Figure 1:
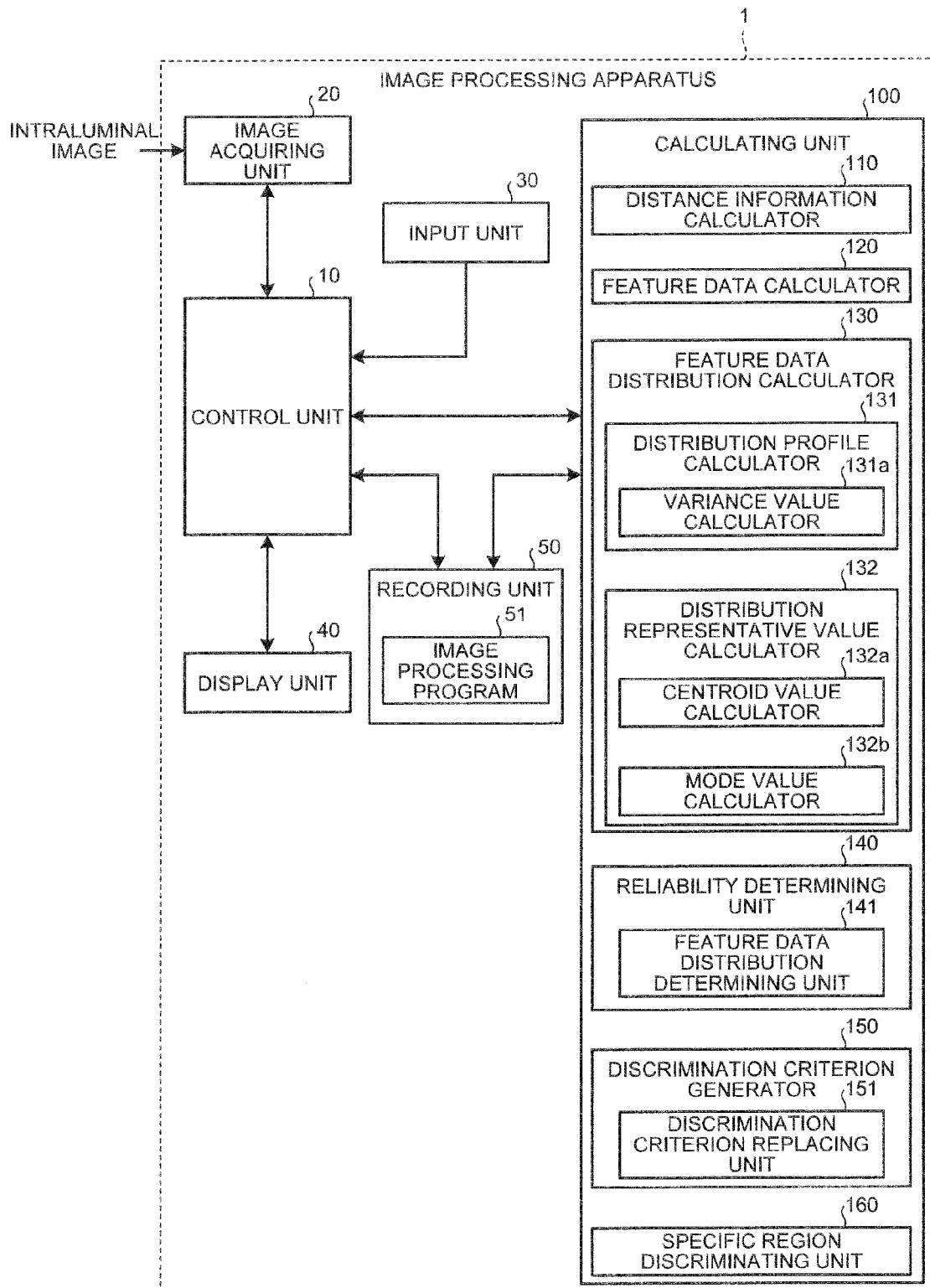
FIG. 1 is a block diagram of a configuration of an image processing apparatus according to a first embodiment of the present invention.

FIG. 1 is a block diagram of a configuration of an image processing apparatus according to a first embodiment of the present invention. An image processing apparatus 1 illustrated in FIG. 1 includes a control unit 10 that controls overall operations of the image processing apparatus 1, an image acquiring unit 20 that acquires image data corresponding to an image captured by a medical observation apparatus, an input unit 30 that receives an input signal input from an external apparatus, a display unit 40 that displays various contents, a recording unit 50 for storing various programs and the image data acquired by the image acquiring unit 20, and a calculating unit 100 that performs predetermined image processing on the image data.

The control unit 10 is realized by hardware, such as a CPU. The control unit 10 reads various programs stored in the recording unit 50 and gives an instruction or transfers data to units of the image processing apparatus 1 in accordance with image data input by the image acquiring unit 20 or an operation signal input by the input unit 30, thereby integrally controls the whole operations of the image processing apparatus 1.

The image acquiring unit 20 is appropriately structured according to the configuration of a system including a medical observation apparatus. For example, if the medical observation apparatus is a capsule endoscope and a portable recording medium is used to deliver image data to and from the medical observation apparatus, the image acquiring unit 20 includes a reader device, to which the recording medium is detachably attachable and which reads image data of an intraluminal image stored in the recording medium. If a server is installed for storing image data of an intraluminal image captured by the medical observation apparatus, the image acquiring unit 20 includes, for example, a communication device connectable to the server and acquires the image data of the intraluminal image through a data communication with the server. Alternatively, the image acquiring unit 20 may include, for example, an interface device that receives an image signal from the medical observation apparatus, such as an endoscope, via a cable.

The input unit 30 is realized by an input device, such as a keyboard, a mouse, a touch panel, or various switches, and outputs a received input signal to the control unit 10.

The display unit 40 is realized by a display device, such as a LCD or an EL display, and displays various screens including an intraluminal image under the control of the control unit 10.

The recording unit 50 is realized by an information recording medium and a reader device of the information recording medium. Examples of the information recording medium include various IC memories, such as a ROM or a RAM being a flash memory that enables update and record of data; a built-in hard disk; a hard disk connected via a data communication terminal; and a CD-ROM. The recording unit 50 stores therein the image data of the intraluminal image acquired by the image acquiring unit 20, programs for operating the image processing apparatus 1 and causing the image processing apparatus 1 to implement various functions, data used for execution of the programs, or the like. Specifically, the recording unit 50 stores therein an image processing program 51 for dividing the intraluminal image into a plurality of regions based on distance information, generating a discrimination criterion for each of the regions to discriminate a specific region, such as an abnormal area, from the intraluminal image, and performing a process for discriminating the specific region according to the discrimination criterion.

The calculating unit 100 is realized by hardware, such as a CPU. The calculating unit 100 reads the image processing program 51 to perform image processing on the image data corresponding to the intraluminal image and performs various calculation processes for discriminating the specific region from the intraluminal image.

A detailed configuration of the calculating unit 100 will be explained below.

As illustrated in FIG. 1, the calculating unit 100 includes a distance information calculator 110 that calculates distance information corresponding to a distance between a medical observation apparatus that has captured an image and an imaging object; a feature data calculator 120 that calculates feature data of each of pixels in an image; a feature data distribution calculator 130 that calculates a distribution of the feature data (hereinafter, also described as "a feature data distribution") in each of regions that are classified according to the distance information in the image; a reliability determining unit 140 that determines the reliability of the feature data distribution in each of the regions; a discrimination criterion generator 150 that generates a discrimination criterion for discriminating a specific region in the image for each of the regions, based on a determination result obtained from the reliability determining unit 140 and the feature data distribution in each of the regions; and a specific region discriminating unit 160 that discriminates the specific region in the image based on the discrimination criterion.

The feature data distribution calculator 130 includes a distribution characteristic calculator 131 that calculates the characteristic of the feature data distribution; and a distribution representative value calculator 132 that calculates a representative value of the feature data distribution. Specifically, the distribution characteristic calculator 131 includes a variance value calculator 131a that calculates a variance value of the feature data distribution. The distribution representative value calculator 132 includes a centroid value calculator 132a that calculates a centroid value of the feature data distribution and a mode value calculator 132b that calculates a mode value of the feature data distribution.

The reliability determining unit 140 includes a feature data distribution determining unit 141 and determines whether the reliability of the feature data distribution is higher or lower than a predetermined threshold based on the characteristic or the representative value of feature data distribution calculated by the feature data distribution calculator 130.

The discrimination criterion generator 150 generates a discrimination criterion for a region in which the reliability of the feature data distribution is determined to be low by the reliability determining unit 140, by using a feature data distribution of a region in which the reliability of the feature data distribution is determined to be high. Specifically, the discrimination criterion generator 150 includes a discrimination criterion replacing unit 151 that replaces the feature data distribution of the region in which the reliability is determined to be low by the reliability determining unit 140 with the feature data distribution of the region in which the reliability is determined to be high. The discrimination criterion generator 150 generates a discrimination criterion based on the feature data distribution replaced by the discrimination criterion replacing unit 151.

Figure 2:
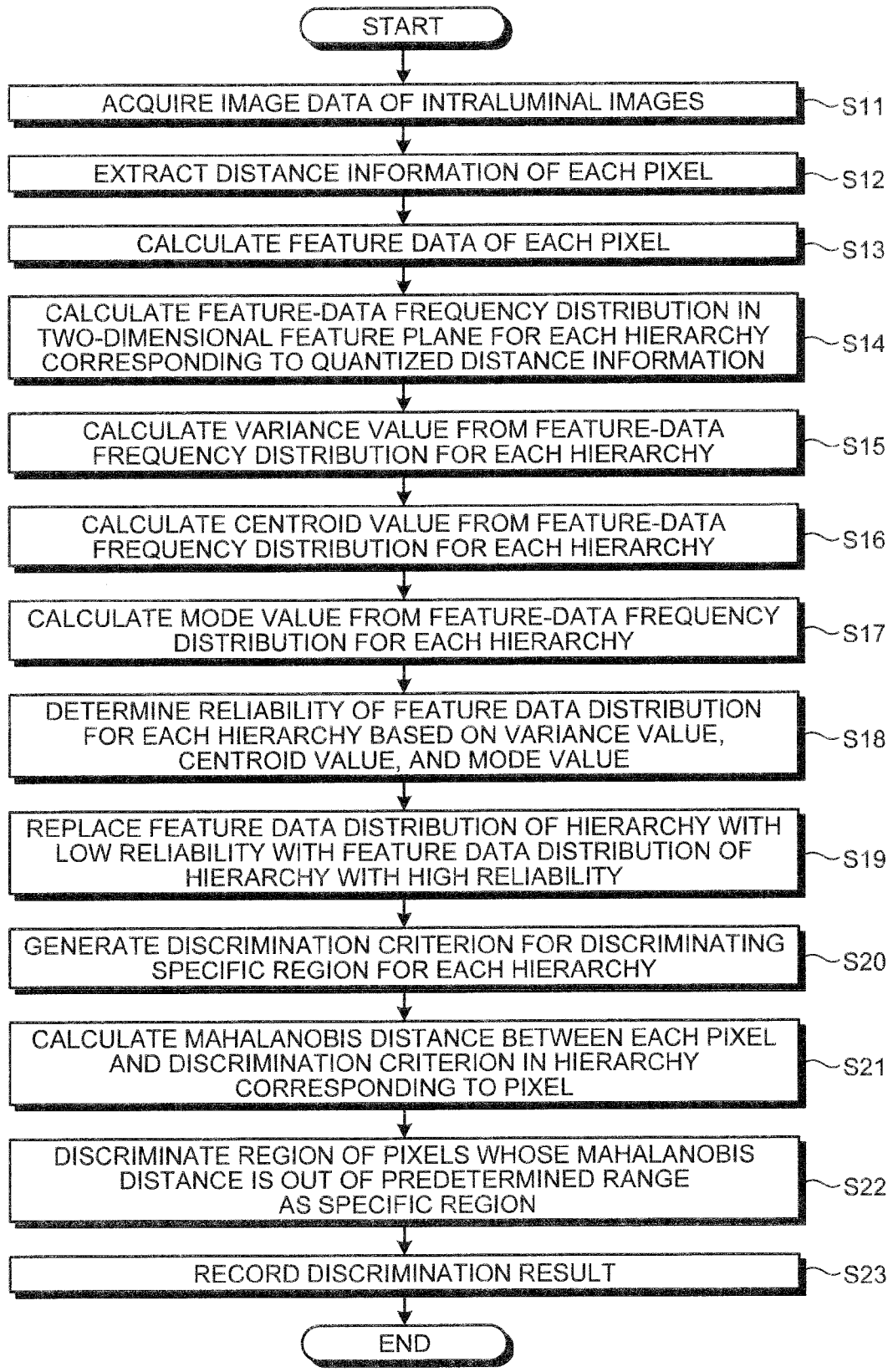
FIG. 2 is a flowchart of an operation performed by the image processing apparatus illustrated in FIG. 1.

The operation of the image processing apparatus 1 will be explained below. FIG. 2 is a flowchart of the operation performed by the image processing apparatus 1.

At Step S11, the image acquiring unit 20 acquires a series of intraluminal images captured inside a lumen of a subject and stores the intraluminal images in the recording unit 50. The calculating unit 100 sequentially reads pieces of image data of each corresponding image being a processing target from the recording unit 50.

Figure 3:
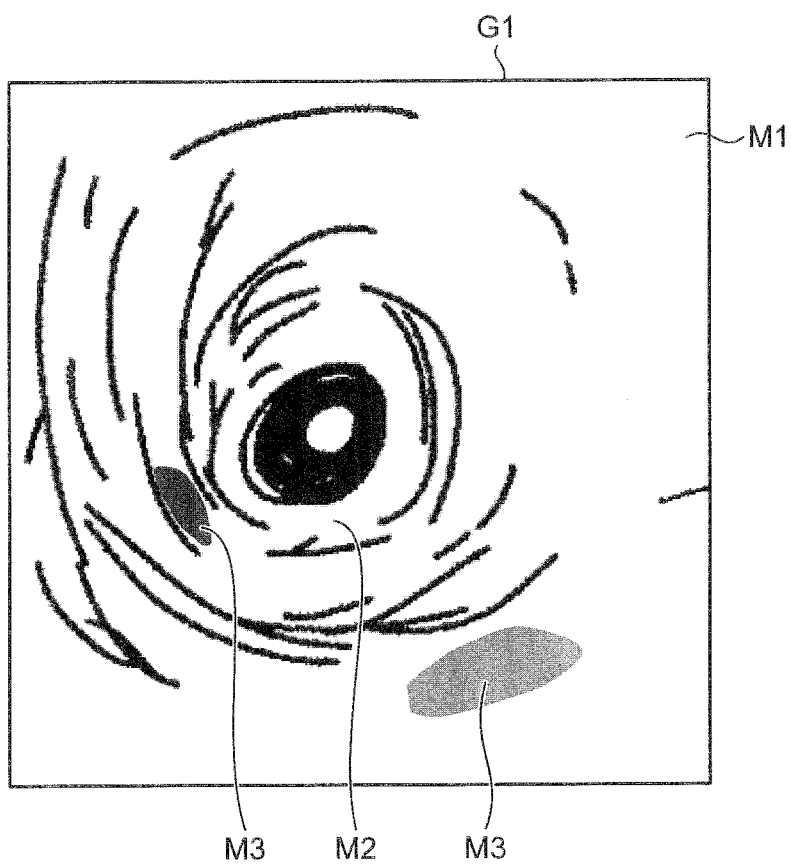
FIG. 3 is a schematic diagram illustrating an example of an intraluminal image being a processing target.

FIG. 3 is a schematic diagram illustrating an example of the image being the processing target. In an image G1 illustrated in FIG. 3, a mucous membrane M1, which is a near view from a medical observation apparatus that has captured the image G1, and a mucous membrane M2, which is a distant view showing a deep-seated portion of a lumen, appear through a content fluid. Furthermore, important sites, such as lesions M3, sometimes appear in the image G1.

At Step S12, the distance information calculator 110 extracts the distance information from each of pixels in the image. In the first embodiment, a value of an R component (hereinafter, described as an R value) is used as the distance information. The R component is a wavelength component that has the longest wavelength of all the R, G, B components and that can hardly be absorbed and scattered in a living body. Therefore, the R component enables both the near view and the distant view of an intraluminal image to be imaged while preventing absorption or scattering of illumination light or reflected light by the imaging object or the content fluid (e.g., bile). That is, the R component is a component that best reflects the distance information from the medical observation apparatus to the imaging object. As the distance information, various values that have a positive correlation with a distance to the imaging object in the depth direction in the image may be used instead of the R value. For example, it may be possible to use luminance or a control value of automatic gain control as the distance information. The automatic gain control is a control mechanism for maintaining uniform brightness by automatically reducing the light intensity when the medical observation apparatus approaches the imaging object.

At Step S13, the feature data calculator 120 acquires pixel values (an R value, a G value, and a B value) of each of the pixels in the image and calculates feature data. Specifically, the feature data calculator 120 calculates, for each of the pixels, a value of G/R, a value of B/G, and a distance-information quantized value ($R_1$, $R_2$, . . . ) that is obtained by quantizing (discretizing) the distance information (the R value) at a predetermined interval. Consequently, the pieces of the distance information are classified into a plurality of hierarchies.

Figure 4:
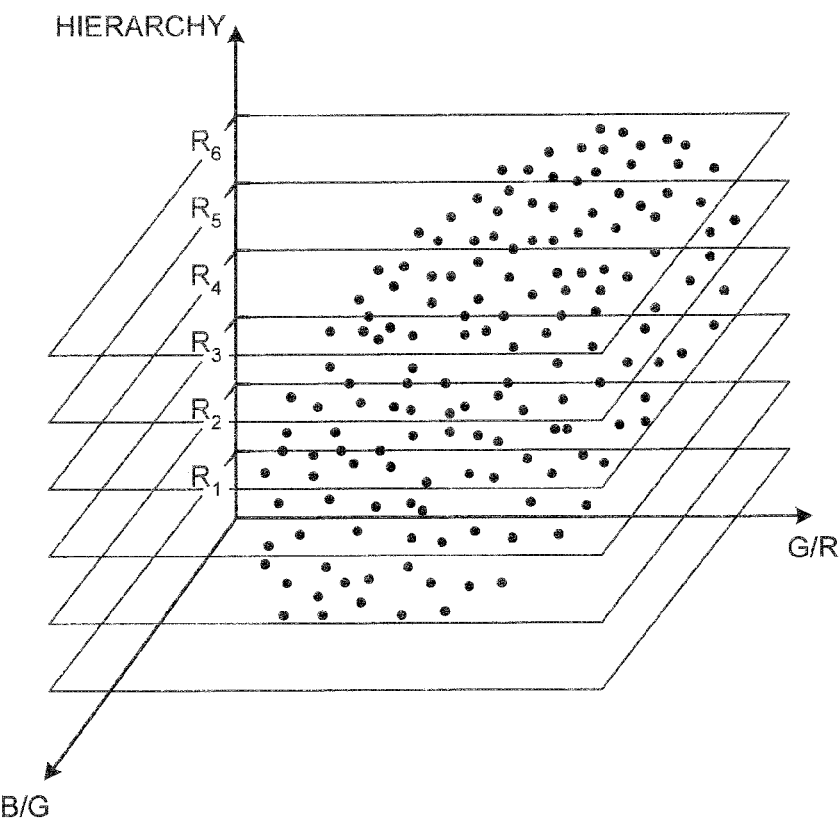
FIG. 4 is a schematic diagram illustrating feature-data frequency distributions in two-dimensional feature planes for respective hierarchies based on distance information.

At Step S14, the feature data distribution calculator 130 calculates a frequency distribution of the feature data (hereinafter, also described as a feature-data frequency distribution) in a two-dimensional feature plane for each of the hierarchies corresponding to the respective pieces of the quantized distance information. Specifically, as illustrated in FIG. 4, in a feature space formed by three axes of G/R, B/G, and the quantized value of the distance information (the hierarchies $R_1$, $R_2$, . . . ), the pieces of the feature data of the pixels calculated at Step S13 are projected. Accordingly, the feature-data frequency distribution in a G/R-B/G feature plane is calculated for each of the hierarchies $R_1$, $R_2$, . . . . The values of G/R and B/G may be quantized for the process or may be used as they are in the form of continuous values.

Figure 5:
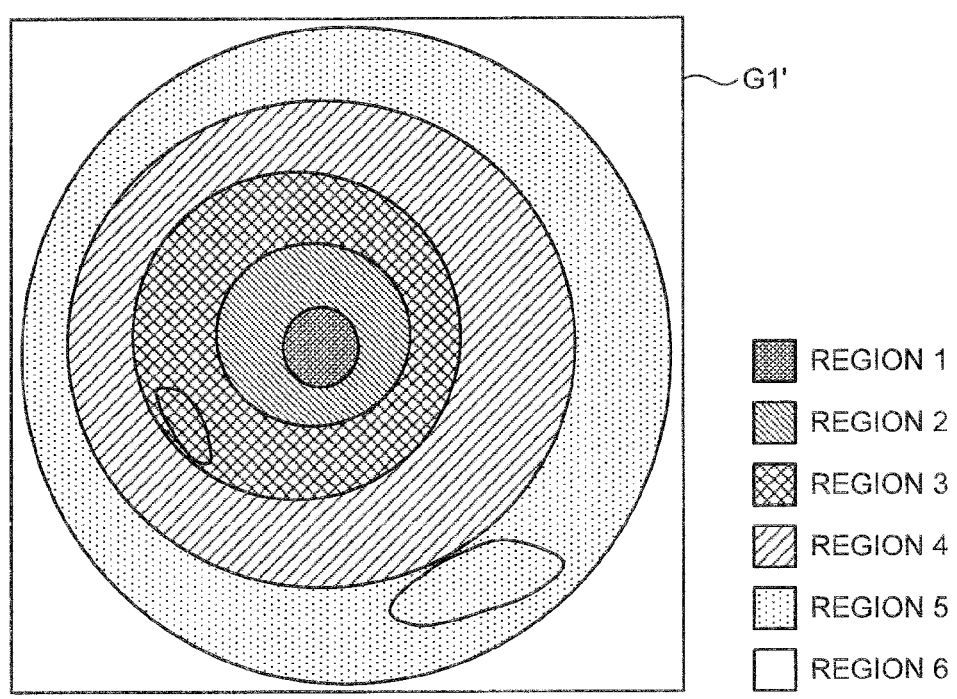
FIG. 5 is a schematic diagram illustrating regions in an actual image space, which are corresponding to the respective hierarchies in a feature space illustrated in FIG. 4.

In this way, each piece of the feature space divided into a plurality of hierarchies based on the distance information corresponds to one of regions that are classified according to a distance to the imaging object in an actual image space. For example, in an image G1' illustrated in FIG. 5, a region 1 being a distant view to a region 6 being a near view correspond to the hierarchies $R_1$ to $R_6$ ($R_6$>$R_1$) illustrated in FIG. 4, respectively.

Figure 6:
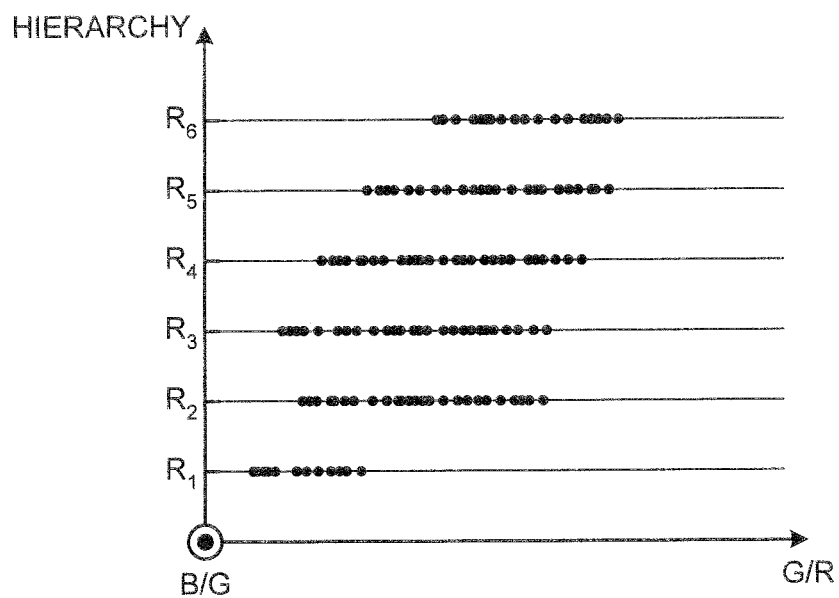
FIG. 6 is a schematic diagram illustrating the feature-data frequency distributions for the respective hierarchies when the distance information is quantized.

FIG. 6 is a schematic diagram in which two-dimensional feature planes of the respective hierarchies $R_1$ to $R_6$ illustrated in FIG. 4 are projected on the G/R axis. In the following, for simplicity of explanation, an explanation is given with reference to the schematic diagram of the projection on the G/R axis. However, in actuality, the process is performed on a two-dimensional plane formed by the G/R axis and the B/G axis.

At Step S15, the variance value calculator 131a calculates a variance value from the feature-data frequency distribution for each of the hierarchies $R_1$ to $R_6$.

At Step S16, the centroid value calculator 132a calculates a centroid value (an average value) from the feature-data frequency distribution for each of the hierarchies $R_1$ to $R_6$.

At Step S17, the mode value calculator 132b calculates a mode value from the feature-data frequency distribution for each of the hierarchies $R_1$ to $R_6$.

Figure 7:
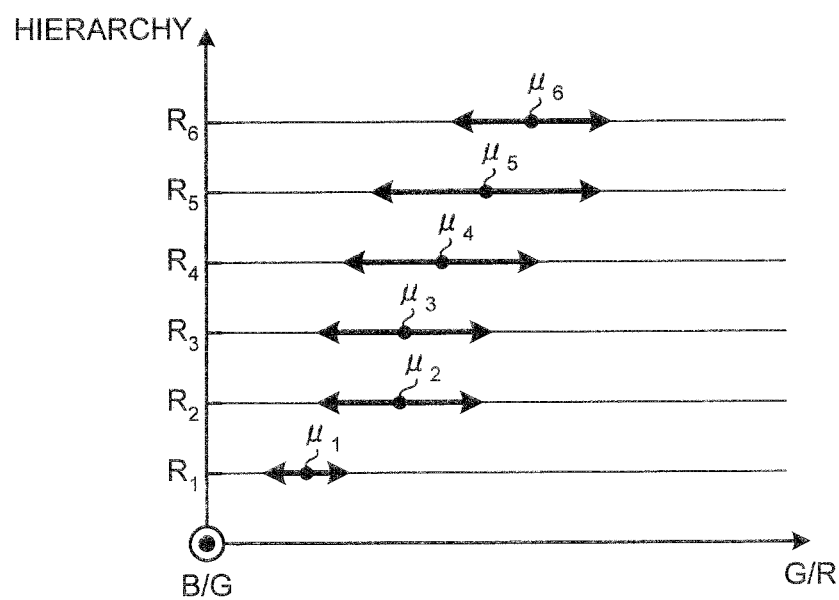
FIG. 7 is a schematic diagram illustrating centroid values and variance values of the feature data distributions for the respective hierarchies.

FIG. 7 is a schematic diagram illustrating the characteristics and the representative values of the feature data distributions for the respective hierarchies $R_1$ to $R_6$ calculated at Steps S15 to S17. In FIG. 7, centroid values $\mu_1$ to $\mu_6$ are illustrated as the representative values. Double-headed arrows illustrated at the respective hierarchies $R_1$ to $R_6$ indicate dispersions of feature distributions corresponding to variance values $\sigma_1^2$ to $\sigma_6^2$ (for example, $\pm\sigma$).

At Step S18, the reliability determining unit 140 determines the reliability of the feature data distribution for each of the hierarchies based on the variance value, the centroid value, and the mode value. Specifically, the variance value, the centroid value, and the mode value of each of the hierarchies $R_1$ to $R_6$ are compared with respective reference values with predetermined ranges set in advance for the variance value, the centroid value, and the mode value. When all the variance value, the centroid value, and the mode value are within the respective ranges of the reference values, it is determined that the reliability of the feature data distribution in the hierarchy is high, and in other cases, it is determined that the reliability of the feature data distribution in the hierarchy is low. At this time, when at least one of the variance value, the centroid value, and the mode value is within the range of a corresponding reference value, it may be possible to determine that the reliability of the feature data distribution is high. In an intraluminal image, a color range is determined to a certain extent for each type of organs, such as a stomach, a small intestine, and a large intestine. Therefore, the ranges of the reference values of the variance value, the centroid value, and the mode value used to determine the reliability may be set for each type of organs.

Figure 8:
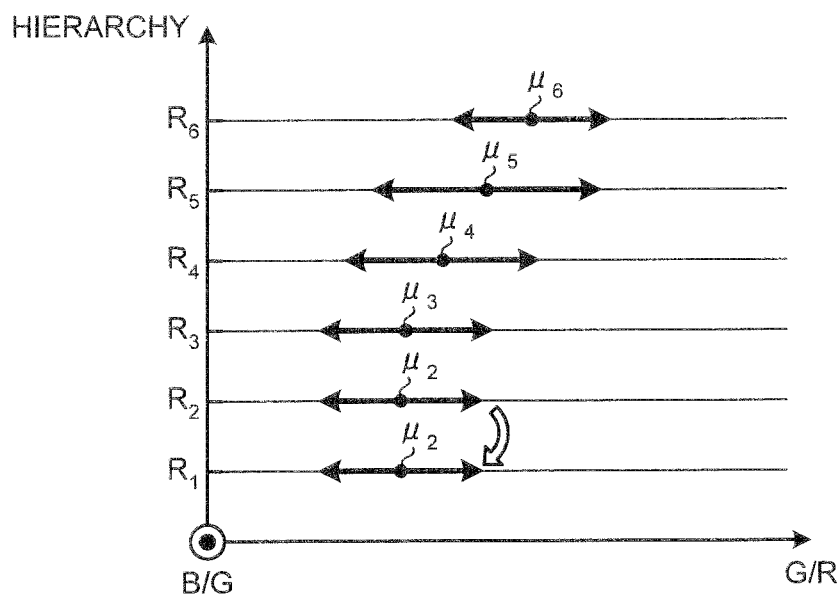
FIG. 8 is a diagram explaining replacement of a discrimination criterion in a hierarchy in which the reliability of a feature data distribution is low.

At Step S19, the discrimination criterion replacing unit 151 replaces a feature data distribution (the centroid value and the variance value) in a hierarchy in which the reliability of the feature data distribution is determined to be low with a feature data distribution of a neighboring hierarchy in which the reliability is determined to be high. For example, in FIG. 7, when it is determined that the reliability of the feature data distribution in the hierarchy $R_1$ is low, the discrimination criterion replacing unit 151 replaces the centroid value $\mu_1$ and the variance value $\sigma_1^2$ in the hierarchy $R_1$ with the centroid value $\mu_2$ and the variance value $\sigma_2^2$ in the hierarchy $R_2$ located near the hierarchy $R_1$, respectively (see FIG. 8).

When the reliabilities are determined to be high in neighboring hierarchies on both sides of a hierarchy in which the reliability of a feature data distribution is determined to be low, it is possible to apply a centroid value and a variance value of any of the neighboring hierarchies to the hierarchy having the low reliability. In this case, it may be possible to set a priority order in advance to determine which neighboring hierarchy is employed in replacing the centroid value and the variance value. For example, it may be possible to give priority to a neighboring hierarchy whose variance value or centroid value is closer to the variance value or the centroid value of the hierarchy with the low reliability, or to give priority to a neighboring hierarchy containing a more number of pieces of pixel data that are used as a basis for the calculation of the feature data distribution.

At Step S20, the discrimination criterion generator 150 generates, for each of the hierarchies, a discrimination criterion for discriminating a specific region. Specifically, the discrimination criterion generator 150 acquires the feature data distribution of each of the hierarchies $R_1$ to $R_6$, and records the centroid values and the variance values as the discrimination criteria in the recording unit 50. At this time, for a hierarchy in which the feature data distribution has been replaced, the replaced feature data distribution is acquired and recorded. For example, for the hierarchy $R_1$, the centroid value $\mu_2$ and the variance value $\sigma_2^2$, which are the replaced values, are used as the discrimination criterion.

At Step S21, the specific region discriminating unit 160 reads the discrimination criterion of each of the hierarchies $R_1$ to $R_6$ for each of the pixels from the recording unit 50, and performs, on all the pixels in the image, a process for calculating a Mahalanobis distance between each of the pixels and the discrimination criterion (see Digital Image Processing, CG-ARTS Societies, pp. 222-223).

At Step S22, the specific region discriminating unit 160 discriminates, as the specific region (an abnormal region), a region of pixels whose Mahalanobis distances are out of a predetermined range set in advance (i.e., a region that significantly differs from the discrimination criterion).

At Step S23, the calculating unit 100 records a discrimination result obtained at Step S22 in the recording unit 50. Alternatively, the discrimination result may be displayed on the display unit 40.

As described above, according to the first embodiment, the reliability of the feature data distribution is determined for each of the hierarchies that are classified based on the distance information, the centroid value and the variance value of a hierarchy in which the reliability of the feature data distribution is determined to be low is replaced with the centroid value and the variance value of a hierarchy in which the reliability of the feature data distribution is determined to be high, and the specific region is discriminated by using the replaced centroid value and the replaced variance value as the discrimination criterion. Therefore, according to the first embodiment, it is possible to generate a discrimination criterion with accuracy even in a region that has a small number of pieces of pixel data because of division into regions based on the distance. Consequently, by using the discrimination criterion as described above, it becomes possible to discriminate the specific region with accuracy.

Modification 1-1

In the first embodiment described above, three indices such as the variance value, the centroid value, and the mode value are used to determine the reliability of a feature data distribution for each hierarchy. However, it may be possible to determine the reliability based on only one of the indices. As the index used for the determination, various other values, such as a moment of a distribution, which indicates the characteristics of the feature data distribution, may be used instead of the above indices.

Modification 1-2

Figure 9:
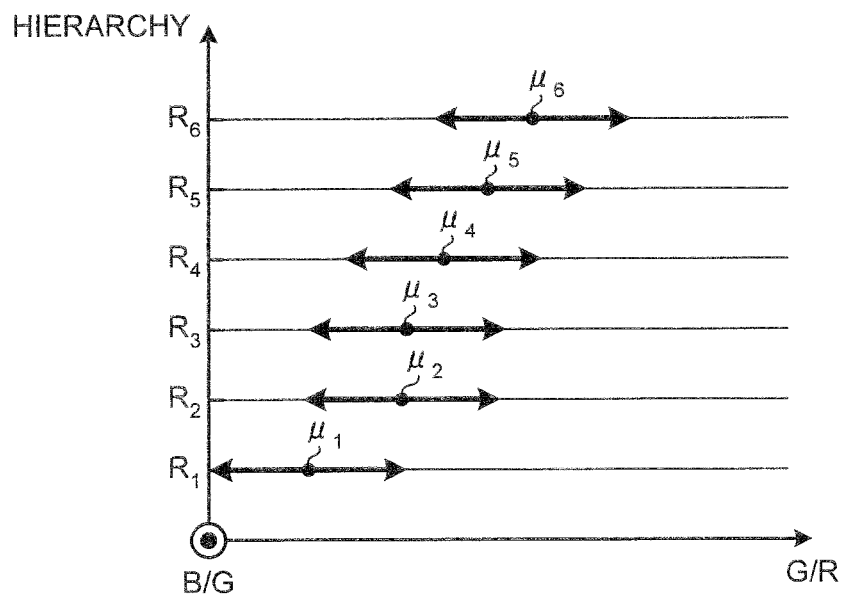
FIG. 9 is a diagram explaining another example of replacement of the discrimination criterion.

When generating the discrimination criterion, it may be possible to apply the centroid value and the variance value of a hierarchy, in which the reliability of the feature data distribution is determined to be high, to the discrimination criteria used for all the other hierarchies. Specifically, when the reliability of the feature data distribution in the hierarchy $R_4$ illustrated in FIG. 7 is determined to be high, the variance values $\sigma_1^2$ to $\sigma_3^2$, $\sigma_5^2$, and $\sigma_{62}$ in the respective hierarchies $R_1$ to $R_3$, $R_5$, and $R_6$ are replaced with the variance value $\sigma_4^2$ (see FIG. 9). Double-headed arrows illustrated in FIG. 9 indicate dispersions of the feature data distribution corresponding to the variance value $\sigma_4^2$ (for example, ±σ4).

Alternatively, it is possible to collectively apply all the discrimination criteria of hierarchies, in each of which the feature data distribution is determined to be high (for example, an average may be calculated), to the discrimination criteria in other hierarchies. Specifically, when it is determined that the reliabilities of the feature data distributions in the hierarchies $R_2$ to $R_6$ illustrated in FIG. 7 are high, it may be possible to calculate an average value AVE ($\sigma_2^2$ to $\sigma_6^2$) of the variance values $\sigma_2^2$ to $\sigma_6^2$, and replace the variance values $\sigma_2^2$ to $\sigma_6^2$ of the hierarchies $R_1$ to $R_6$ with the average value AVE ($\sigma_2^2$ to $\sigma_6^2$).

Modification 1-3

In the first embodiment described above, a calculation of the feature data distribution of each of the hierarchies, a determination of the reliability, and a replacement of the discrimination criterion are performed based on the feature data that is calculated for each of the pixels. However, it is possible to perform the processes based on feature data that is calculated for each of small regions that are obtained by dividing an image based on edge strengths.

Division of images based on the edge strengths is performed by, for example, the following method. First, the edge strength of each of pixels contained in an image being a processing target is calculated. The edge strength is calculated by using a known method, such as differential filter processing using a Sobel filter or the like. Subsequently, the image is divided into a plurality of edge regions by using ridges of the edge strengths as boundaries. Specifically, an edge strength image, in which the edge strength of each of the pixels is used as a pixel value, is generated, and a gradient direction of the edge strengths of the pixels in the edge strength image is acquired. The gradient direction is assumed to be a direction in which the values of the edge strengths become smaller. Thereafter, a pixel having the minimum value along the gradient direction starting from each of the pixels is searched for, and the image is divided such that pixels at start points of any neighboring pixels having the minimum values are contained in the same region (see International Patent Publication No. WO2006/080239).

Alternatively, as the method for dividing the image, it is possible to use a known method, such as a watershed algorithm (see Luc Vincent and Pierre Soille, "Watersheds in Digital Spaces: An Efficient Algorithm Based on Immersion Simulations", IEEE Transactions on Pattern Analysis and Machine Intelligence, Vol. 13, No. 6, pp. 583-598, June 1991).

According to the modification 1-3, the feature-data frequency distribution is calculated based on the feature data in units of small regions, each of which is a collection of a plurality of pixels. Therefore, it is possible to determine the reliability and generate the discrimination criterion in which the feature in the small region is reflected, and it is also possible to increase a calculation speed.

Second Embodiment

A second embodiment of the present invention will be explained below.

Figure 10:
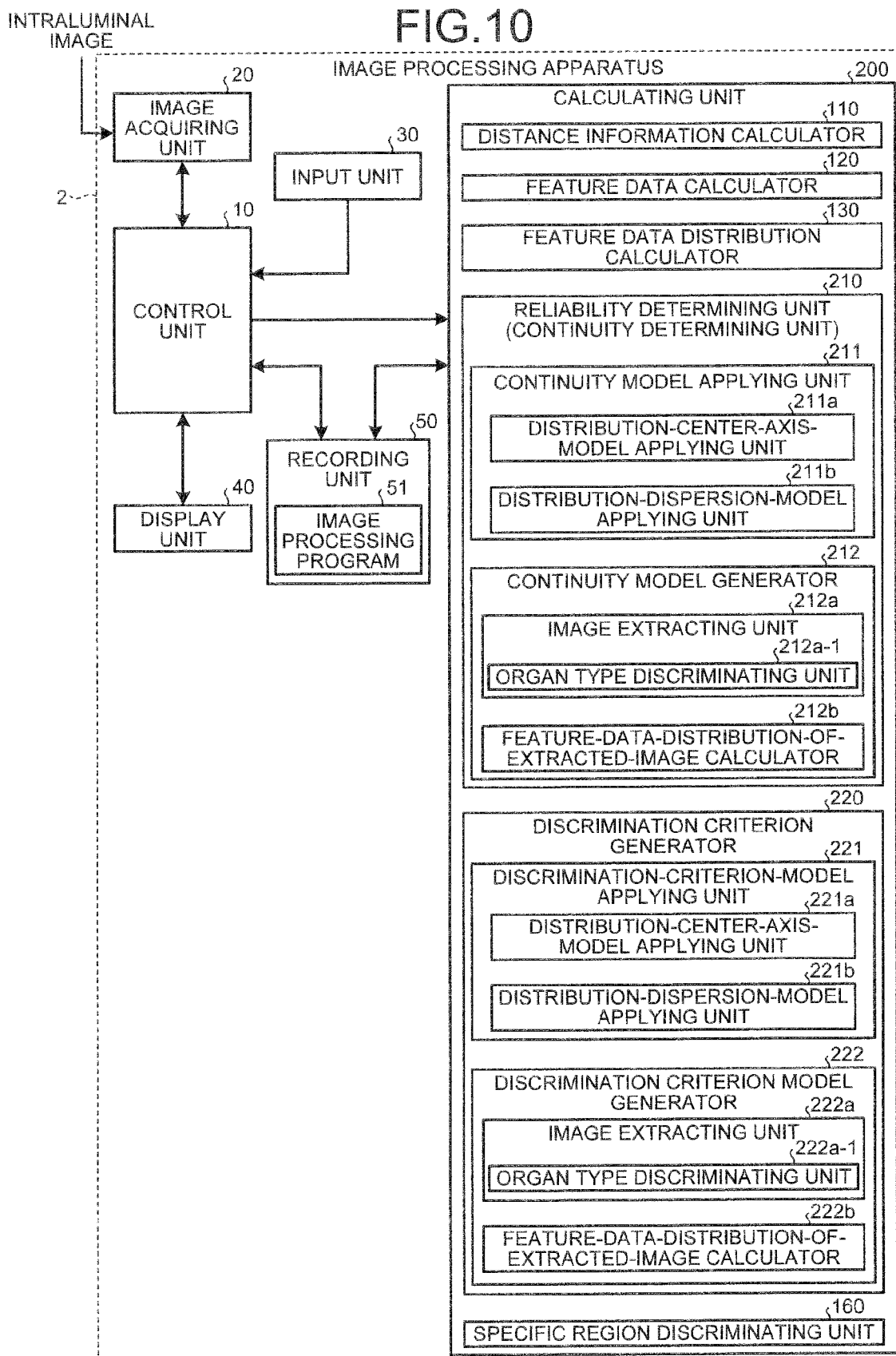
FIG. 10 is a block diagram of a configuration of an image processing apparatus according to a second embodiment of the present invention.

FIG. 10 is a block diagram of a configuration of an image processing apparatus according to a second embodiment. An image processing apparatus 2 illustrated in FIG. 10 includes a calculating unit 200 instead of the calculating unit 100 illustrated in FIG. 1. The calculating unit 200 includes the distance information calculator 110; the feature data calculator 120; the feature data distribution calculator 130; a reliability determining unit (a continuity determining unit) 210; a discrimination criterion generator 220; and the specific region discriminating unit 160. Among these units, the operations of the distance information calculator 110, the feature data calculator 120, the feature data distribution calculator 130, and the specific region discriminating unit 160 are the same as those described in the first embodiment.

The reliability determining unit (the continuity determining unit) 210 determines the continuity of feature data distributions of a plurality of regions that are classified by the distance information, thereby determining the reliabilities of the feature data distributions. Specifically, the reliability determining unit 210 includes a continuity model applying unit 211 that applies a continuity model, in which the continuity of the feature data distributions of the regions is approximated, to a feature data distribution; and a continuity model generator 212 that generates the continuity model. The reliability determining unit 210 determines the continuity of the feature data distributions of the regions based on an application result obtained by the continuity model applying unit 211. The reliability determining unit 210 determines that the reliability is high when there is the continuity is present and that the reliability is low when there is no continuity.

Of the above units, the continuity model applying unit 211 includes a distribution-center-axis-(representative value)-model applying unit 211a that applies a continuity model, which is determined depending on the center axis (the representative value) of a feature data distribution, to a feature data distribution; and a distribution-dispersion-model applying unit 211b that applies a continuity model, which is determined depending on the dispersion of a feature data distribution, to a feature data distribution. Specifically, the center axis of the feature data distribution corresponds to a representative value of the feature data distribution, such as a centroid value, an average value, or a mode value.

The continuity model generator 212 includes an image extracting unit 212a that extracts a plurality of images from a series of images captured inside a lumen of a subject; and a feature-data-distribution-of-extracted-image calculator 212b that calculates feature data distributions of the respective images extracted by the image extracting unit 212a. The continuity model generator 212 generates a continuity model based on the feature data distributions of the respective images. The image extracting unit 212a includes an organ type discriminating unit 212a-1 that discriminates the type of an organ of each of the images, and extracts an image based on the type of the organ of each of the images.

The discrimination criterion generator 220 generates a discrimination criterion for discriminating a specific region in the image, based on a determination result obtained by the reliability determining unit 210 and the feature data distribution in each of the regions. At this time, for a region in which the reliability is determined to be low by the reliability determining unit 210, the discrimination criterion generator 220 generates a discrimination criterion by using a model in which the continuity of the feature data distributions of a plurality of regions is approximated. Specifically, the discrimination criterion generator 220 includes a discrimination-criterion-model applying unit 221 that applies the model, in which the continuity of the feature data distributions of the plurality of regions is approximated, to a region in which the reliability is determined to be high by the reliability determining unit 210; and a discrimination criterion model generator 222 that generates the model, in which the continuity of the feature data distributions of the plurality of regions is approximated. The discrimination criterion generator 220 generates a discrimination criterion based on an application result obtained by the discrimination-criterion-model applying unit 221.

Of the above units, the discrimination-criterion-model applying unit 221 includes a distribution-center-axis-(representative value)-model applying unit 221a that applies a model, which is determined according to the center axis of a feature data distribution (i.e., a representative value, such as a centroid value, an average value, or a mode value, of the feature data distribution), to a feature data distribution; and a distribution-dispersion-model applying unit 221b that applies a model, which is determined according to the dispersion of a feature data distribution, to a feature data distribution.

The discrimination criterion model generator 222 includes an image extracting unit 222a that extracts a plurality of images from a series of images captured inside a lumen of a subject; and a feature-data-distribution-of-extracted-image calculator 222b that calculates feature data distributions of the respective images extracted by the image extracting unit 222a. The discrimination criterion model generator 222 generates the above model based on the feature data distributions of the respective images. The image extracting unit 222a includes an organ type discriminating unit 222a-1 that discriminates the type of an organ of each of the images, and extracts an image based on the type of the organ of each of the images.

Figure 11:
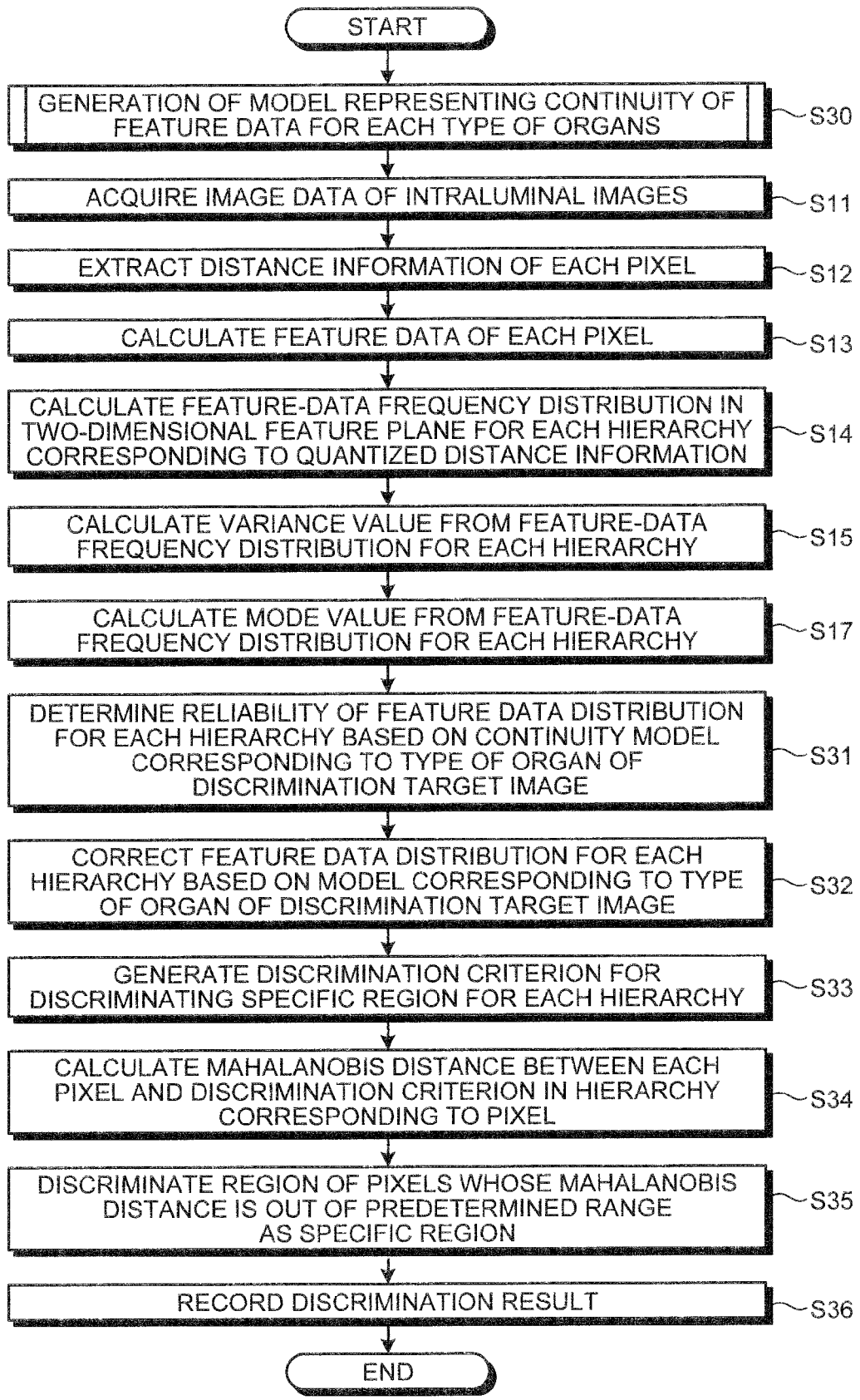
FIG. 11 is a flowchart of an operation performed by the image processing apparatus illustrated in FIG. 10.

The operation of the image processing apparatus 2 will be explained below. FIG. 11 is a flowchart of the operation performed by the image processing apparatus 2.

Figure 12:
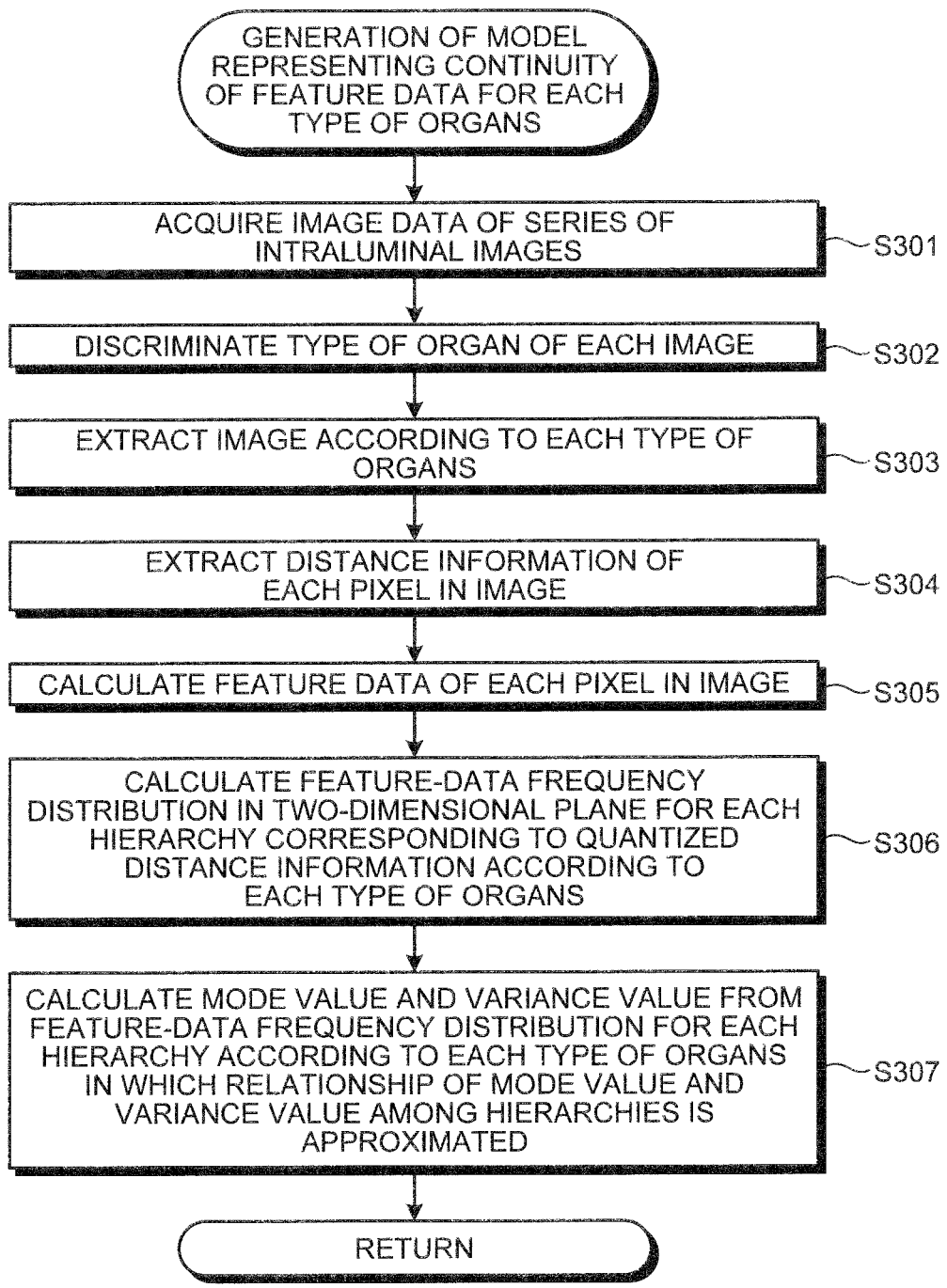
FIG. 12 is a flowchart illustrating a detailed process for generating a discrimination criterion model for each type of organs.

At Step S30, the reliability determining unit 210 generates a model representing the continuity of feature data for each type of organs. FIG. 12 is a flowchart illustrating a detailed process performed at Step S30.

At Step S301, the reliability determining unit 210 acquires pieces of image data corresponding to images that are captured in series by a capsule endoscope or the like inside a lumen of a subject.

At Step S302, the organ type discriminating unit 212a-1 performs a process for discriminating the type of an organ on each of the acquired images. Various known methods are applicable as a method for discriminating the type of an organ. In the second embodiment, for example, an explanation is given of a method in which the type of an organ is discriminated based on the average R, G, and B values of an image. First, a value range of each of the R, G, and B color elements is determined in advance for each type of organs, such as an esophagus, a stomach, a small intestine, and a large intestine. The organ type discriminating unit 212a-1 calculates an average value for each of the R values, the G values, and the B values of pixels in an image being a discrimination target image, and compares the average values with pre-set value ranges of the respective color elements, thereby discriminating the type of an organ of the image. For example, when the average values of the R values, the G values, and the B values of the image are within the value ranges of the respective color elements of a small intestine, the organ type discriminating unit 212a-1 discriminates the type of the organ of the discrimination target image as the small intestine. For another example, when the average values of the R values, the G values, and the B values of the image are within the value ranges of the respective color elements of a large intestine, the organ type discriminating unit 212a-1 discriminates the type of the organ of the discrimination target image as the large intestine (see Japanese Laid-open Patent Publication No. 2006-288612). The type of the organ discriminated as above is recorded in association with image data of each of the images.

At Step S303, the image extracting unit 212a randomly extracts images according to each type of organs from the series of images. Alternatively, the image extracting unit 212a may extract images according to each type of organs at regular intervals.

At Step S304, the distance information calculator 110 performs, on each of the images, a process for extracting distance information from each of the pixels in the image. As the distance information, for example, the value of an R component, which is a wavelength component that can hardly be absorbed or scattered in a living body, is used.

At Step S305, the feature data calculator 120 performs, on all the images extracted according to each type of organs, a process for acquiring the pixel value of each of the pixels in the image and calculating featured data. As the feature data, a value of G/R, a value of B/G, and a distance-information quantized value, which is obtained by quantizing the distance information (the R values) at a predetermined interval, are calculated.

At Step S306, the feature-data-distribution-of-extracted-image calculator 212b calculates a feature-data frequency distribution in a two-dimensional feature plane for each of the hierarchies corresponding to the quantized distance information according to each type of organs. Specifically, pieces of the feature data of all the pixels calculated according to each type of organs at Step S305 are projected in the feature space formed by the three axes of G/R, B/G, and the distance-information quantized value as illustrated in FIG. 4.

Figure 13:
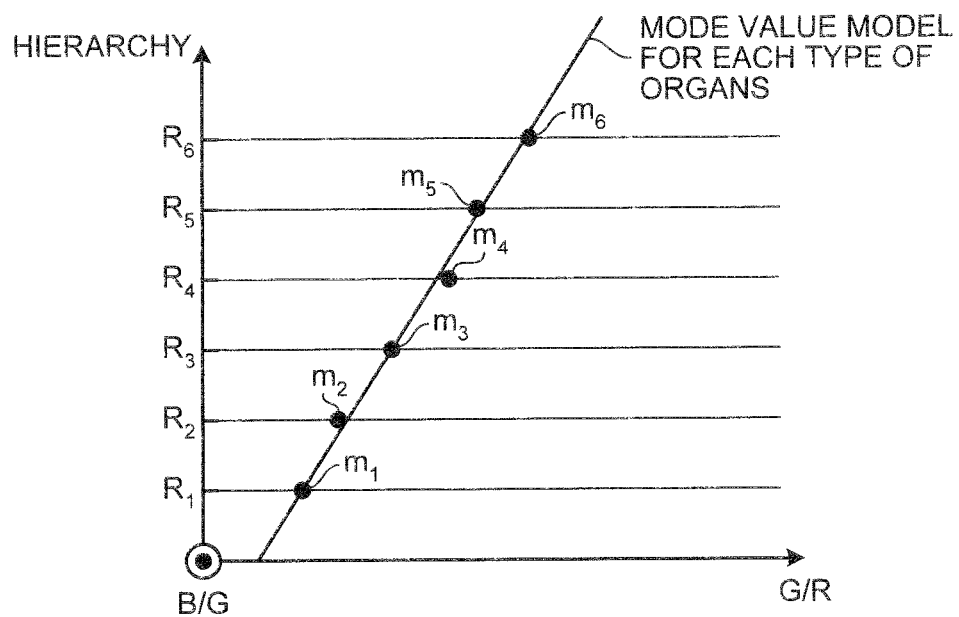
FIG. 13 is a schematic diagram illustrating a model representing the continuity of mode values among a plurality of hierarchies.
Figure 14:
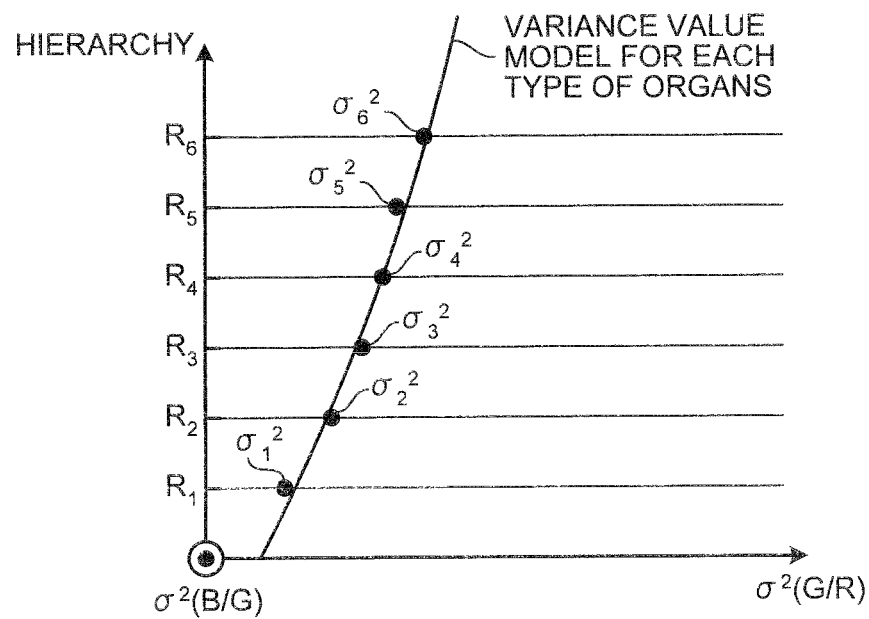
FIG. 14 is a schematic diagram illustrating a model representing the continuity of variance values among a plurality of hierarchies.

At Step S307, the continuity model generator 212 calculates the mode value and the variance value of each of the hierarchies according to each type of organs based on the feature-data frequency distribution, and generates a model in which the relationship of the mode value and the variance value (the continuity) among the hierarchies is approximated. The mode value and the variance value can be approximated by, for example, a least square method. The approximation expression at this time may be a primary expression or a secondary expression. FIG. 13 is a schematic diagram illustrating a model (hereinafter, described as a mode value model) representing the continuity of the mode values, which is generated based on the mode values $m_1$ to $m_6$ of the respective hierarchies $R_1$ to $R_6$. FIG. 14 is a schematic diagram illustrating a model (hereinafter, described as a variance value model) representing the continuity of the variance values, which is generated based on the variance values $\sigma_1^2$ to $\sigma_6^2$ of the respective hierarchies $R_1$ to $R_6$. The mode value model and the variance value model as illustrated in FIG. 13 and FIG. 14, respectively, are generated for each type of organs.

Thereafter, the process returns to the main routine.

The processes performed at Steps S11 to S15 and S17 are the same as those explained in the first embodiment.

At Step S31, the continuity model applying unit 211 determines the reliability of the feature data distribution for each of the hierarchies based on the continuity model corresponding to the type of an organ of a processing target image.

Figure 15:
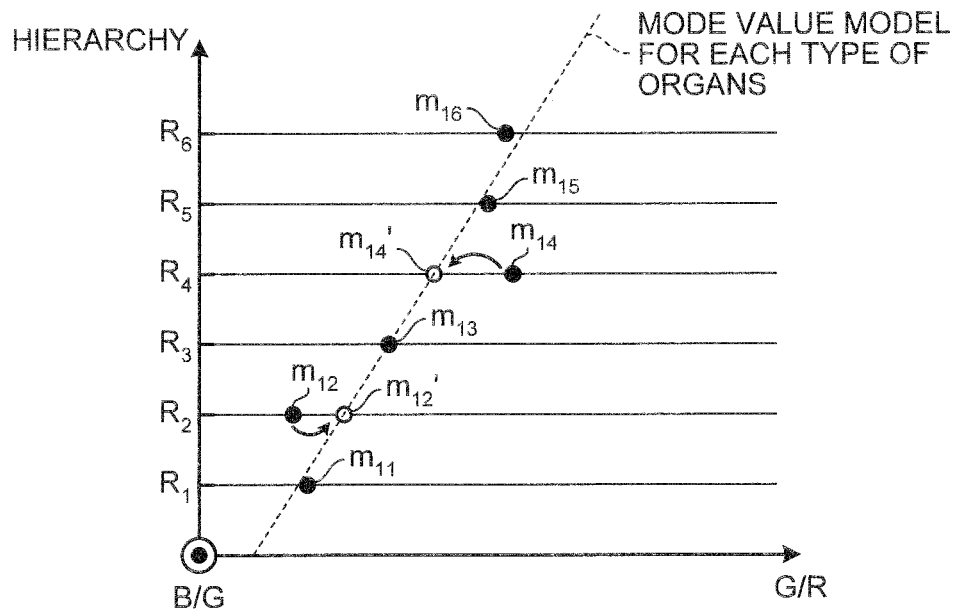
FIG. 15 is a schematic diagram explaining determination of the reliability and application of the discrimination criterion based on the continuity model of the mode values.

Specifically, the distribution-center-axis-model applying unit 211a applies, for example, the mode value model generated for each type of organs as illustrated in FIG. 15 to mode values $m_{11}$ to $m_{16}$ of the respective hierarchies calculated for a processing target image. As a result, it is determined that a feature data distribution of a hierarchy, in which a difference between the mode value and the mode value model is equal to or greater than a predetermined threshold in the processing target image, does not have the continuity with the other hierarchies and the reliability of this feature data distribution is low. In the case in FIG. 15, the reliabilities of the mode values $m_{12}$ and $m_{14}$ in the hierarchies $R_2$ and $R_4$ are determined to be low.

Figure 16:
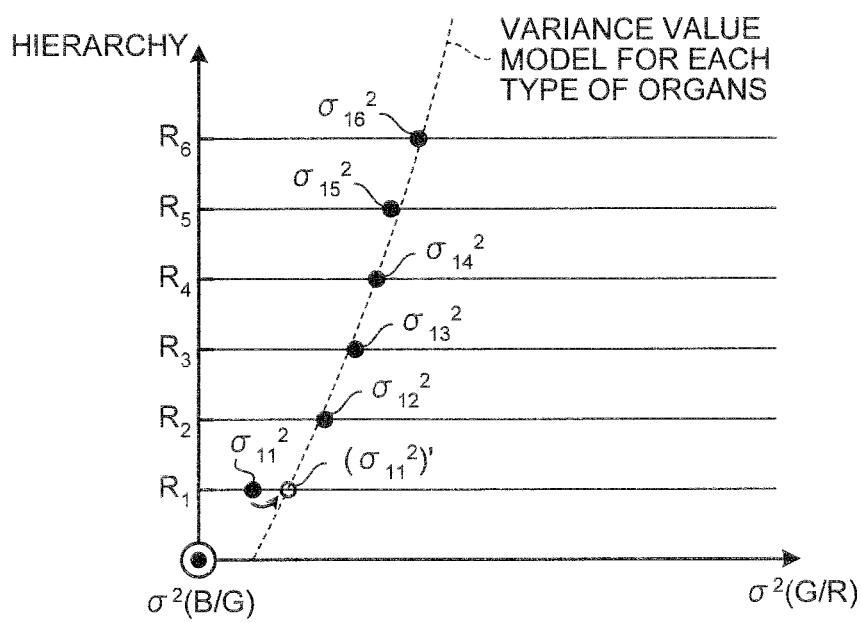
FIG. 16 is a schematic diagram explaining determination of the reliability and application of the discrimination criterion based on the continuity model of the variance values.

The distribution-dispersion-model applying unit 211b applies, for example, the variance value model generated for each type of organs as illustrated in FIG. 16 to variance values $\sigma_{12}^2$ to $\sigma_{16}^2$ of the respective hierarchies calculated for the processing target image. As a result, it is determined that a feature data distribution of a hierarchy, in which a difference between the variance value and the variance value model is equal to or greater than a predetermined threshold in the processing target image, does not have the continuity with the other hierarchies and the reliability of this feature data distribution is low. In the case in FIG. 16, the reliability of the variance value $\sigma_{11}^2$ of the hierarchy $R_1$ is determined to be low.

At Step S32, the discrimination-criterion-model applying unit 221 corrects a feature data distribution for each of the hierarchies based on the model corresponding to the type of the organ of the processing target image. The discrimination-criterion-model applying unit 221 may use an application model that is generated by the discrimination criterion model generator 222 in the same manner as in the process at Step S30 or may acquire the continuity model generated by the continuity model generator 212.

Specifically, the distribution-center-axis-model applying unit 221a applies, as illustrated in FIG. 15 for example, the mode value model corresponding to each type of organs to the mode value of a hierarchy, in which the reliability is determined to be high, from among the mode values $m_{11}$ to $m_{16}$ calculated for the respective hierarchies $R_1$ to $R_6$. Then, the mode value of a hierarchy in which the reliability is determined to be low is replaced with a value on the mode value model. In the case in FIG. 15, the mode value ($m_{12}$) of the hierarchy $R_2$ is replaced with a value $m_{12}$', and the mode value ($m_{14}$) of the hierarchy $R_4$ is replaced with a value $m_{14}$'. Alternatively, the mode values of all the hierarchies $R_1$ to $R_6$ may be replaced with values on the mode value model.

The distribution-dispersion-model applying unit 221b applies, as illustrated in FIG. 16 for example, the variance value model corresponding to each type of organs to the variance value of a hierarchy, in which the reliability is determined to be high, from among the variance values $\sigma_{12}^2$ to $\sigma_{15}^2$ calculated for the respective hierarchies $R_1$ to $R_6$. Then, the variance value of a hierarchy in which the reliability is determined to be low is replaced with a value on the variance value model. In the case in FIG. 16, the variance value ($\sigma_{11}^2$) of the hierarchy $R_1$ is replaced with a value ($\sigma_{11}^2$)'. Alternatively, the variance values of all the hierarchies $R_1$ to $R_6$ may be replaced with values on the variance value model.

At Step S33, the discrimination criterion generator 220 generates, for each of the hierarchies, a discrimination criterion for discriminating a specific region. Specifically, the discrimination criterion model generator 222 acquires the feature data distribution of each of the hierarchies $R_1$ to $R_6$, and records the mode value and the variance value as the discrimination criterion in the recording unit 50. At this time, for the hierarchy in which the feature data distribution has been corrected, the corrected feature data distribution is acquired and recorded.

At Step S34, the specific region discriminating unit 160 reads the discrimination criterion of each of the hierarchies $R_1$ to $R_6$ for each of the pixels from the recording unit 50, and performs, on all the pixels in the image, a process for calculating a Mahalanobis distance between each of the pixels and the discrimination criterion.

At Step S35, the specific region discriminating unit 160 discriminates a region of pixels whose Mahalanobis distance is out of a predetermined range set in advance (i.e., a region that significantly differs from the discrimination criterion) as the specific region (an abnormal region).

At Step S36, the calculating unit 200 records a discrimination result obtained at Step S35 in the recording unit 50. Alternatively, the discrimination result may be displayed on the display unit 40.

As described above, according to the second embodiment, the reliability of the feature data distribution for each of the hierarchies is determined and corrected by using the continuity model in which the characteristics of each type of the organs is reflected, and the corrected feature data distribution is used as the discrimination criterion to discriminate the specific region. Therefore, it is possible to improve the accuracy of region discrimination.

In the above explanation, the continuity models are generated for the mode value and the variance value. However, it is possible to generate the continuity model by using the centroid value instead of the mode value or to generate a model of other indices (for example, a moment or the like) indicating the characteristics of the feature data distribution.

According to the first and the second embodiments and the modifications, the reliability of the feature data distribution in each of the regions classified by the distance information is determined, and the discrimination criterion for discriminating a specific region is generated based on the determination result and the feature data distribution. Therefore, it is possible to generate the discrimination criterion for each of the region with accuracy.

The image processing apparatus according to the first and the second embodiments and the modifications explained above can be realized by causing a computer system, such as a personal computer or a work station, to execute an image processing program recorded in a recording medium. The computer system may be used by being connected to devices, such as other computer systems or servers, via a local area network (LAN), a wide area network (WAN), or a public line, such as the Internet. In this case, the image processing apparatus according to the first and the second embodiments and the modifications acquires image data of an intraluminal image via the network, outputs an image processing result to various output devices (a viewer or a printer) connected via the network, or stores the image processing result in a storage device (a recording device and a reader device of the recording device) connected via the network.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus comprising:
   a processor; and
   a memory storing computer readable instructions that, when executed by the processor, implement:
   a distance information calculator that is configured to calculate distance information corresponding to a distance to an imaging object at each of portions in an image;
   a feature data calculator that is configured to calculate feature data at each of the portions in the image;
   a feature data distribution calculator that is configured to calculate a distribution of the feature data in each of regions that are classified according to the distance information in the image;
   a reliability determining unit that is configured to determine a reliability of the distribution of the feature data in each of the regions; and
   a discrimination criterion generator that is configured to generate, for each of the regions, a discrimination criterion for discriminating a specific region in the image based on a determination result of the reliability and the distribution of the feature data in each of the regions;
   wherein:
   the reliability determining unit is configured to determine the reliability of the distribution of the feature data in each of the regions by comparing a characteristic or representative value of the distribution of the feature data in each of the regions with reference values with a predetermined range set in advance or determine the reliability of the distribution of the feature data in each of the regions based on a continuity of characteristics or representative values of the distributions of the feature data by applying a model, in which the relationship of the characteristics or representative values of the distribution of the feature data among hierarchies corresponding to the regions that are obtained by classifying the distance information via quantizing the distance information is approximated, to the distributions of the feature data, thereby determining the continuity of the distributions of the feature data between the regions; and the discrimination criterion generator is configured to generate, for a region in which the reliability of the distribution of the feature data is determined to be lower than a predetermined threshold by the reliability determining unit, a discrimination criterion by using a distribution of feature data in a region in which the reliability of the distribution of the feature data is determined to be higher than the predetermined threshold by the reliability determining unit.

2. The image processing apparatus according to claim 1, wherein the feature data calculator is configured to calculate feature data of each of pixels in the image.

3. The image processing apparatus according to claim 1, wherein the feature data calculator is configured to calculate feature data for each of small regions that are obtained by dividing the image based on an edge strength.

4. The image processing apparatus according to claim 1, wherein the feature data distribution calculator is configured to calculate the distribution of the feature data for each of hierarchies that are obtained by classifying the distance information via quantizing the distance information.

5. The image processing apparatus according to claim 1, wherein the feature data distribution calculator includes a distribution characteristic calculator including a variance value calculator that is configured to calculate a variance value of the distribution of the feature data.

6. The image processing apparatus according to claim 1, wherein the feature data distribution calculator includes a distribution representative value calculator including a centroid value calculator that is configured to calculate a centroid value of the distribution of the feature data.

7. The image processing apparatus according to claim 1, wherein the feature data distribution calculator includes a distribution representative value calculator including a mode value calculator that is configured to calculate a mode value of the distribution of the feature data.

8. The image processing apparatus according to claim 1, wherein the continuity model applying unit includes a distribution representative model applying unit that is configured to apply a model, which is determined according to a representative value of the distribution of the feature data, to a distribution of feature data.

9. The image processing apparatus according to claim 1, wherein the continuity model applying unit includes a distribution-dispersion-model applying unit that is configured to apply a model, which is determined according to a dispersion of the distribution of the feature data, to a distribution of feature data.

10. The image processing apparatus according to claim 1, wherein the reliability determining unit includes a continuity model generator that is configured to generate a model representing the continuity of the distributions of the feature data between the regions.

11. The image processing apparatus according to claim 10, wherein the continuity model generator includes:

an image extracting unit that is configured to extract a plurality of images from a series of images captured inside a lumen of a subject; and a feature-data-distribution-of-extracted-image calculator that is configured to calculate distributions of feature data of the respective images extracted by the image extracting unit, wherein the continuity model generator is configured to generate a model representing the continuity based on the distributions of the feature data of the respective images.

12. The image processing apparatus according to claim 11, wherein the image extracting unit includes an organ type discriminating unit that is configured to discriminate a type of an organ of each of the series of images, and is configured to extract a plurality of images based on the type of the organ of each of the images.

13. The image processing apparatus according to claim 1, wherein the discrimination criterion generator includes a discrimination criterion replacing unit that is configured to replace a distribution of feature data in a first region, in which the reliability is determined to be low by the reliability determining unit, with a distribution of feature data in a second region, in which the reliability is determined to be high by the reliability determining unit, wherein the second region corresponds to a neighboring hierarchy of a hierarchy corresponding to the first region, the hierarchy being obtained via quantizing the distance information, and wherein the discrimination criterion generator is configured to generate the discrimination criterion based on the distribution of the feature data replaced by the discrimination criterion replacing unit.

14. The image processing apparatus according to claim 1, wherein the discrimination criterion generator is configured to generate, for at least a region in which the reliability is determined to be lower than a predetermined threshold by the reliability determining unit, a discrimination criterion by using a model in which the continuity of the distributions of the feature data between the regions is approximated.

15. The image processing apparatus according to claim 14, wherein the discrimination criterion generator includes a discrimination-criterion-model applying unit that is configured to apply the model to a region in which the reliability is determined to be higher than a predetermined threshold by the reliability determining unit, and wherein the discrimination criterion generator is configured to generate the discrimination criterion based on an application result obtained by the discrimination-criterion-model applying unit.

16. The image processing apparatus according to claim 15, wherein the discrimination-criterion-model applying unit includes a distribution representative value applying unit that is configured to apply a model, which is determined depending on a representative value of a distribution of feature data, to a distribution of feature data.

17. The image processing apparatus according to claim 15, wherein the discrimination-criterion-model applying unit includes a distribution-dispersion-model applying unit that is configured to apply a model, which is determined depending on a dispersion of a distribution of feature data, to a distribution of feature data.

18. The image processing apparatus according to claim 15, wherein the discrimination criterion generator includes a discrimination criterion model generator that is configured to generate a model in which the continuity of the distributions of the feature data between the regions is approximated.

19. The image processing apparatus according to claim 18, wherein the discrimination criterion model generator includes:

an image extracting unit that is configured to extract a plurality of images from a series of images captured inside a lumen of a subject; and a feature-data-distribution-of-extracted-image calculator that is configured to calculate distributions of feature data of the respective images extracted by the image extracting unit, wherein the discrimination criterion model generator is configured to generate a model based on the distributions of the feature data of the respective images.

20. The image processing apparatus according to claim 19, wherein the image extracting unit includes an organ type discriminating unit that is configured to discriminate a type of an organ of each of the series of images, and is configured to extract a plurality of images based on the type of the organ of each of the images.

21. The image processing apparatus according to claim 1, further comprising a specific region discriminating unit that is configured to discriminate a specific region in an image based on the discrimination criterion.

22. An image processing method comprising:
- calculating distance information corresponding to a distance to an imaging object at each of portions in an image;
- calculating feature data at each of the portions in the image;
- calculating a distribution of the feature data in each of regions that are classified according to the distance information in the image;
- determining a reliability of the distribution of the feature data in each of the regions; and
- generating, for each of the regions, a discrimination criterion for discriminating a specific region in the image based on a determination result of the reliability determined at the determining and the feature data distribution in each of the regions;

wherein:
- the determining further comprises determining the reliability of the distribution of the feature data in each of the regions by comparing a characteristic or representative value of the distribution of the feature data in each of the regions with reference values with a predetermined range set in advance or determining the reliability of the distribution of the feature data in each of the regions based on a continuity of characteristics or representative values of the distributions of the feature data by applying a model, in which the relationship of the characteristics or representative values of the distribution of the feature data among hierarchies corresponding to the regions that are obtained by classifying the distance information via quantizing the distance information is approximated, to the distributions of the feature data, thereby determining the continuity of the distributions of the feature data between the regions; and
- the generating further comprises generating, for a region in which the reliability of the distribution of the feature data is determined to be lower than a predetermined threshold, a discrimination criterion by using a distribution of feature data in a region in which the reliability of the distribution of the feature data is determined to be higher than the predetermined threshold.

23. A computer readable recording device with an executable program stored thereon, wherein the program instructs a processor to perform:
- calculating distance information corresponding to a distance to an imaging object at each of portions in an image;
- calculating feature data at each of the portions in the image;
- calculating a distribution of the feature data in each of regions that are classified according to the distance information in the image;
- determining a reliability of the distribution of the feature data in each of the regions; and
- generating, for each of the regions, a discrimination criterion for discriminating a specific region in the image based on a determination result of the reliability determined at the determining and the feature data distribution in each of the regions;

wherein:
- the determining further comprises determining the reliability of the distribution of the feature data in each of the regions by comparing a characteristic or representative value of the distribution of the feature data in each of the regions with reference values with a predetermined range set in advance or determining the reliability of the distribution of the feature data in each of the regions based on a continuity of characteristics or representative values of the distributions of the feature data by applying a model, in which the relationship of the characteristics or representative values of the distribution of the feature data among hierarchies corresponding to the regions that are obtained by classifying the distance information via quantizing the distance information is approximated, to the distributions of the feature data, thereby determining the continuity of the distributions of the feature data between the regions; and
- the generating further comprises generating, for a region in which the reliability of the distribution of the feature data is determined to be lower than a predetermined threshold, a discrimination criterion by using a distribution of feature data in a region in which the reliability of the distribution of the feature data is determined to be higher than the predetermined threshold.

* * * * *